US011189175B2

(12) United States Patent
Kawasaki et al.

(10) Patent No.: US 11,189,175 B2
(45) Date of Patent: Nov. 30, 2021

(54) VEHICLE DISPATCH SYSTEM, VEHICLE DISPATCH APPARATUS USED FOR THE SAME, AND VEHICLE DISPATCH METHOD

(71) Applicant: TOYOTA JIDOSHA KABUSHIKI KAISHA, Toyota (JP)

(72) Inventors: Koji Kawasaki, Anjo (JP); Takenori Shimizu, Inuyama (JP); Naoki Kurokawa, Tokyo-to (JP); Junya Watanabe, Shizuoka-ken (JP); Jun Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 16/176,705

(22) Filed: Oct. 31, 2018

(65) Prior Publication Data

US 2019/0130763 A1 May 2, 2019

(30) Foreign Application Priority Data

Nov. 2, 2017 (JP) .............................. JP2017-212818

(51) Int. Cl.
*G08G 1/00* (2006.01)
*G05D 1/00* (2006.01)
(Continued)

(52) U.S. Cl.
CPC ........... *G08G 1/202* (2013.01); *G05D 1/0088* (2013.01); *G06Q 50/30* (2013.01);
(Continued)

(58) Field of Classification Search
CPC ..................................................... G08G 1/202
See application file for complete search history.

(56) References Cited

U.S. PATENT DOCUMENTS

| 8,457,546 B2 | 6/2013 | Mahajan et al. |
| 9,256,852 B1 | 2/2016 | Myllymaki |
| (Continued) | | |

FOREIGN PATENT DOCUMENTS

| JP | 2012128587 A | 7/2012 |
| JP | 2012230523 A | 11/2012 |
| (Continued) | | |

*Primary Examiner* — Jason E Mattis
(74) *Attorney, Agent, or Firm* — Hunton Andrews Kurth LLP

(57) ABSTRACT

A vehicle dispatch system includes: a plurality of vehicles each configured to perform automated driving and each including a wireless LAN module; and a server configured to communicate with the plurality of vehicles. The wireless LAN module is configured to connect to a user's portable terminal and an access point of a wireless LAN communication network, and is configured to relay wireless communication between the portable terminal and the wireless LAN communication network. The server is configured to output, to a vehicle of the plurality of vehicles, an instruction for dispatching the vehicle by automated driving, in accordance with a vehicle dispatch request from the portable terminal. The vehicle, in response to the instruction, is configured to relay wireless communication between the portable terminal and the wireless LAN communication network by using the wireless LAN module.

9 Claims, 8 Drawing Sheets

(51) Int. Cl.
  *H04B 7/155* (2006.01)
  *H04W 84/00* (2009.01)
  *G06Q 50/30* (2012.01)
  *H04B 17/318* (2015.01)
  *H04W 84/18* (2009.01)
  *H04W 4/40* (2018.01)
  *H04W 40/00* (2009.01)
  *H04W 84/12* (2009.01)

(52) U.S. Cl.
  CPC ....... *H04B 7/15507* (2013.01); *H04B 17/318* (2015.01); *H04W 4/40* (2018.02); *H04W 40/00* (2013.01); *H04W 84/005* (2013.01); *H04W 84/18* (2013.01); *H04W 84/12* (2013.01)

(56) References Cited

U.S. PATENT DOCUMENTS

| | | | |
|---|---|---|---|
| 9,547,309 B2 | 1/2017 | Ross et al. | |
| 2010/0020774 A1 | 1/2010 | Mahajan et al. | |
| 2016/0125735 A1* | 5/2016 | Tuukkanen | G08G 1/202 701/23 |
| 2016/0334797 A1 | 11/2016 | Ross et al. | |
| 2016/0363457 A1* | 12/2016 | Jelavic | H04W 4/90 |
| 2016/0373942 A1 | 12/2016 | Chechani | |
| 2018/0098227 A1* | 4/2018 | Carnelli | H04W 64/003 |
| 2019/0066516 A1* | 2/2019 | Kuhara | G05D 1/0016 |

FOREIGN PATENT DOCUMENTS

| | | |
|---|---|---|
| JP | 2014211693 A | 11/2014 |
| JP | 2015172791 A | 10/2015 |
| WO | 2016198816 A1 | 12/2016 |

\* cited by examiner

VEHICLE DISPATCH

<VEHICLE INFORMATION>

| VEHICLE ID | VEHICLE TYPE | STATUS OF USE | | | | CURRENT LOCATION | WIRELESS LAN MODULE | SOC |
|---|---|---|---|---|---|---|---|---|
| | | RIDING | TRAVELING FOR PICKUP | OUT OF SERVICE | CHARGING | | | |
| 1001 | | Y | | | | P1 | Y | S1 |
| 1002 | | | | Y | | P2 | Y | S2 |
| 1003 | | | | | Y | P3 | Y | S3 |
| 1004 | | | | Y | | P4 | | S4 |
| ⋮ | | | | | | | | |

FIG.9

<EVENT INFORMATION>

| EVENT ID | EVENT NAME | VENUE | NEAREST STATION | TIME | EXPECTED NUMBER OF ATTENDEES |
|---|---|---|---|---|---|
| ev2001 | | | | | |
| ev2002 | | | | | |
| ev2003 | | | | | |
| ⁞ | | | | | |

FIG.10

<WIRELESS INFORMATION>

| ROAD ID | PLACE NAME | POSITION | TIME | RADIO WAVE INTENSITY |
|---|---|---|---|---|
| rd3001 | | | | 3 |
| rd3002 | | | | 4 |
| rd3003 | | | | 0 |
| ⁞ | | | | |

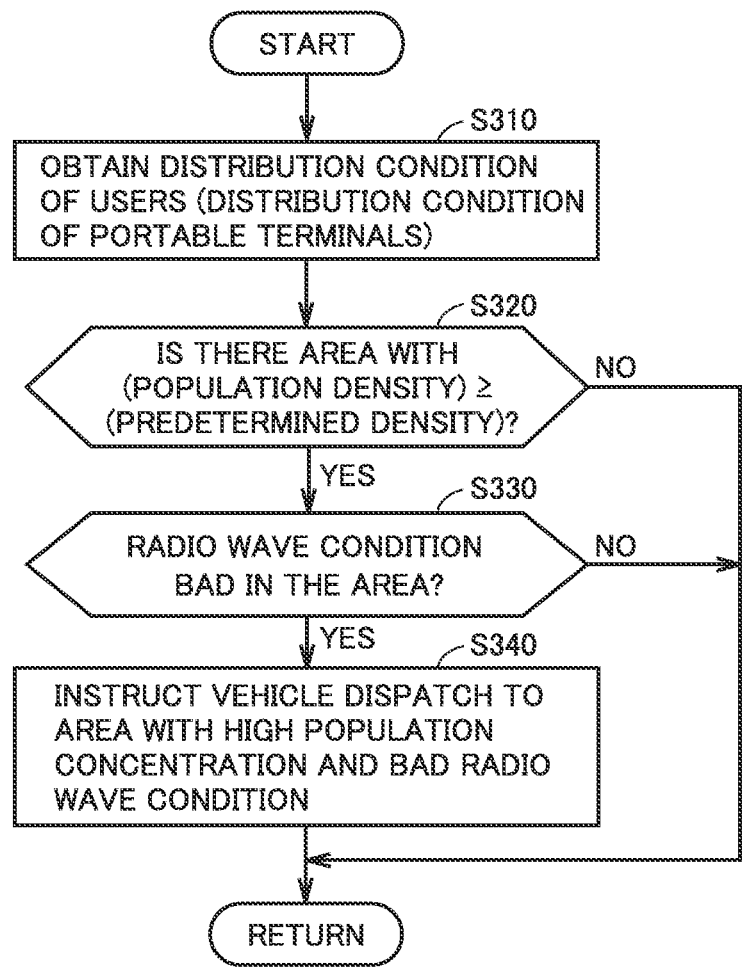

VEHICLE DISPATCH SYSTEM, VEHICLE DISPATCH APPARATUS USED FOR THE SAME, AND VEHICLE DISPATCH METHOD

This nonprovisional application is based on Japanese Patent Application No. 2017-212818 filed on Nov. 2, 2017 with the Japan Patent Office, the entire contents of which are hereby incorporated by reference.

BACKGROUND

Field

The present disclosure relates to a vehicle dispatch system, a vehicle dispatch apparatus used for the same, and a vehicle dispatch method. The present disclosure particularly relates to a technology for dispatching an automated-driving vehicle. Description of the Background Art United States Patent Application Publication No. 2010/0020774 discloses a vehicle equipped with an on-vehicle wireless communication module (or an access point). For example, FIG. 1 and FIG. 2 in United States Patent Application Publication No. 2010/0020774 disclose that a user's computer terminal exchanges data with an external base station via the on-vehicle wireless communication module. Thus, the computer terminal can access the internet in the vehicle while the vehicle is traveling.

SUMMARY

In the vehicle disclosed in United States Patent Application Publication No. 2010/0020774, the user's computer terminal is in the vehicle, and an exchange of data between the computer terminal in the vehicle and an external base station is relayed by the on-vehicle wireless communication module.

In recent years, a vehicle capable of automated driving (automated-driving vehicle) has been developed, and various technologies have been proposed for dispatching an automated-driving vehicle to an appropriate location. Such an automated-driving vehicle can be equipped with a wireless communication module so that the automated-driving vehicle may be utilized as, as it were, a movable relay base station. United States Patent Application Publication No. 2010/0020774 does not particularly consider using an automated-driving vehicle in such a way to enhance convenience of wireless communication.

An object of the present disclosure, which has been made to solve the above problem, is to enhance convenience of wireless communication by using an automated-driving vehicle equipped with a wireless communication device.

(1) A vehicle dispatch system according to one aspect of the present disclosure includes: a plurality of vehicles each configured to perform automated driving and each including a wireless communication device; and a server configured to communicate with the plurality of vehicles. The wireless communication device is configured to connect to a user terminal and an access point of a wireless local area network (LAN) communication network, and is configured to relay wireless communication between the user terminal and the wireless LAN communication network. The server is configured to output, to a vehicle of the plurality of vehicles, an instruction for dispatching the vehicle by automated driving, in accordance with at least one of a vehicle dispatch request from the user terminal and information indicating that a radio wave intensity of the wireless LAN communication network is low. The vehicle, in response to the instruction, is configured to relay wireless communication between the user terminal and the wireless LAN communication network by using the wireless communication device.

According to the configuration of the above (1), when the server receives at least one of a vehicle dispatch request from the user terminal and information indicating that the radio wave intensity of the wireless LAN communication network is low, the server dispatches a vehicle to a location requested by the user or a location where the radio wave intensity of the wireless LAN communication network is low. The wireless communication device mounted on the vehicle reinforces the wireless communication network and enables high-speed data communication of the user terminal, thus enhancing user convenience of wireless communication.

(2) Preferably, the user terminal is configured to send the vehicle dispatch request in response to an operation by a user. The server is configured to dispatch a vehicle of the plurality of vehicles to a location requested by the user, in accordance with the vehicle dispatch request from the user terminal.

According to the configuration of the above (2), a vehicle is dispatched in response to an operation by a user. Thus, the user can select whether to reinforce the radio wave intensity.

(3) Preferably, the user terminal is configured to send the vehicle dispatch request when the user terminal detects that the radio wave intensity of the wireless LAN communication network is low. The server is configured to dispatch a vehicle of the plurality of vehicles to a location such that wireless communication between the user terminal and the wireless LAN communication network can be relayed, in accordance with the vehicle dispatch request from the user terminal.

According to the configuration of the above (3), a vehicle dispatch request is output from the user terminal without an operation by a user. This saves the user selecting the operation.

(4) Preferably, the server is configured to: extract information on a venue of an event from a website on the internet; obtain a location where the radio wave intensity is low between the venue and a transportation facility around the venue; and dispatch, at the time of the event, a vehicle of the plurality of vehicles to the location where the radio wave intensity is low.

(5) More preferably, the vehicle dispatch system further includes a data base containing a result of examination of the radio wave intensity on a route between the venue and the transportation facility. The server is configured to determine whether or not there is a location where the radio wave intensity is low on the route, by using the result of examination contained in the data base.

According to the configurations of the above (4) and (5), a vehicle is dispatched so as to coincide with a large-scale event without a vehicle dispatch request from the user terminal. Thus, wireless communication service can be timely provided to the region of the dispatch location. This eliminates a region where high-speed data communication is impossible, or reduces congestion of communication.

(6) Preferably, the vehicle dispatch system further includes a data base containing a result of examination of the radio wave intensity of the wireless LAN communication network in a predetermined area. The server is configured to determine whether or not the radio wave intensity of the wireless LAN communication network is low in the predetermined area, by using the result of examination contained in the data base and by using information indicating the number of the user terminals in the predetermined area. The server is configured to dispatch a vehicle of the plurality of vehicles to the predetermined area when the server determines that the radio wave intensity is low.

According to the configuration of the above (6), it is determined whether the number of user terminals in a predetermined area is large or small, in other words, whether the population density is high or low. Thus, wireless communication service can be provided to an area with a high population density, a large number of user terminals, and a high demand for high-speed data communication.

(7) A vehicle dispatch apparatus according to another aspect of the present disclosure includes: a communication module configured to communicate with a plurality of vehicles configured to perform automated driving; and a processor configured to execute a process for dispatching the plurality of vehicles. Each of the plurality of vehicles includes a wireless communication device configured to connect to a user terminal and an access point of a wireless LAN communication network and configured to relay wireless communication between the user terminal and the wireless LAN communication network. The processor is configured to output, to a vehicle of the plurality of vehicles, an instruction for dispatching the vehicle by automated driving, in accordance with at least one of a vehicle dispatch request from the user terminal and information indicating that a radio wave intensity of the wireless LAN communication network is low.

According to the configuration of the above (7), the wireless communication device mounted on the vehicle reinforces the wireless communication network and enables high-speed data communication of the user terminal, thus enhancing user convenience of wireless communication, as with the configuration of the above (1).

(8) A vehicle dispatch method according to still another aspect of the present disclosure dispatches a plurality of vehicles configured to perform automated driving. Each of the plurality of vehicles includes a wireless communication device configured to connect to a user terminal and an access point of a wireless LAN communication network and configured to relay wireless communication between the user terminal and the wireless LAN communication network. The vehicle dispatch method includes: receiving at least one of a vehicle dispatch request from the user terminal and information indicating that a radio wave intensity of the wireless LAN communication network is low; outputting, to a vehicle of the plurality of vehicles, an instruction for dispatching the vehicle by automated driving, in accordance with at least one of the vehicle dispatch request and the information; and relaying, by the vehicle, in response to the instruction, wireless communication between the user terminal and the wireless LAN communication network by using the wireless communication device.

According to the method of the above (8), the wireless communication device mounted on the vehicle reinforces the wireless communication network and enables high-speed data communication of the user terminal, thus enhancing user convenience of wireless communication, as with the configurations of the above (1) and (7).

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a diagram showing example event information.

FIG. 10 is a diagram showing example wireless information.

FIG. 11 is a flowchart for explaining control for reinforcement of a communication network in a variation of embodiment 2.

DESCRIPTION OF THE PREFERRED EMBODIMENTS

Figure 1:
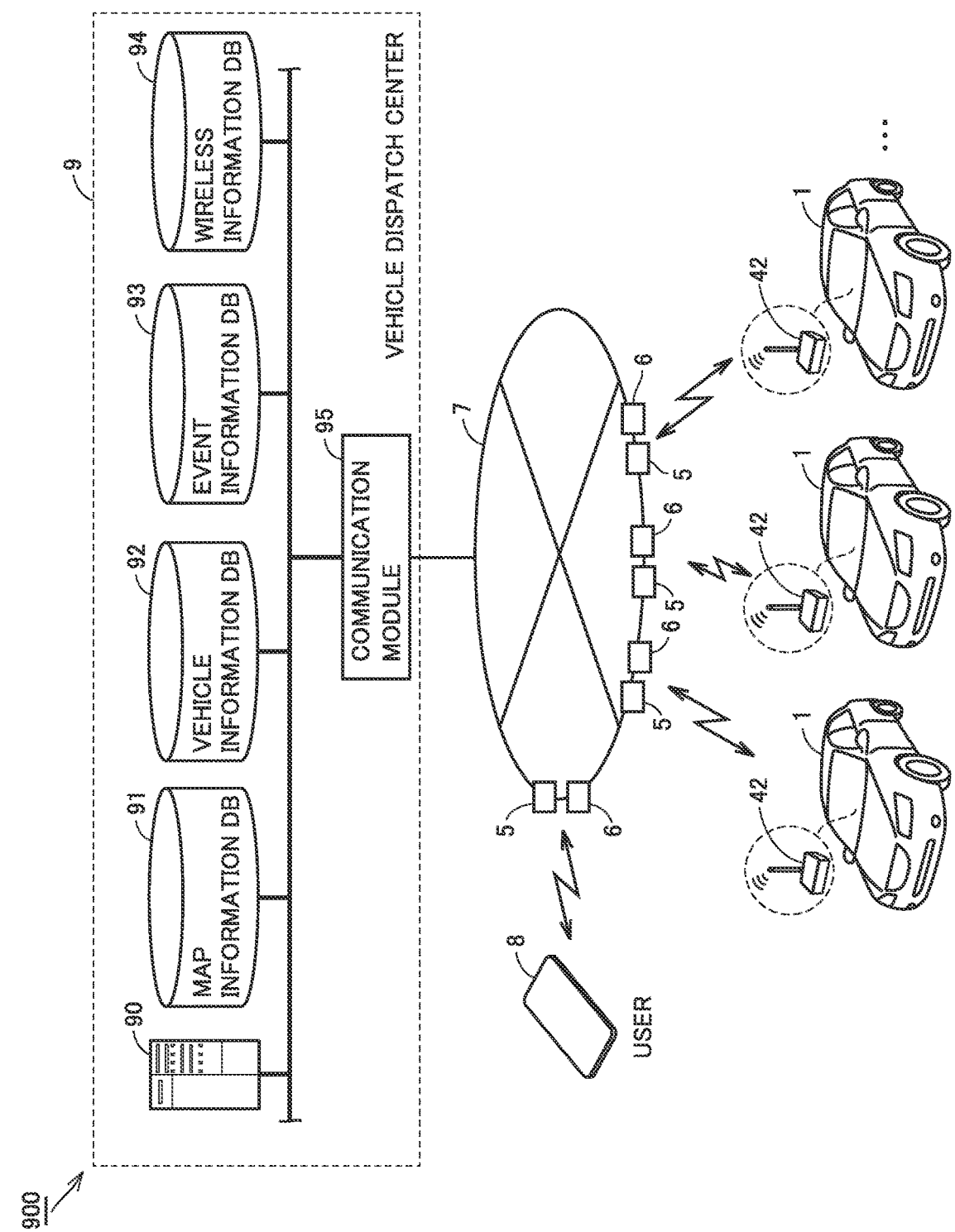
FIG. 1 is a diagram schematically showing a general configuration of a vehicle dispatch system according to embodiment 1.

Embodiments of the present disclosure are described in detail hereinafter with reference to the drawings. Identical or corresponding parts in the drawings are identically denoted, and the explanation thereof is not repeated.

Embodiment 1

<General Configuration of Vehicle Dispatch System>

FIG. 1 is a diagram schematically showing a general configuration of a vehicle dispatch system according to the present embodiment. With reference to FIG. 1, a vehicle dispatch system 900 includes a plurality of vehicles 1 and a vehicle dispatch center 9. Vehicle dispatch center 9 selects appropriate one of the plurality of vehicles in response to a vehicle dispatch request from a portable terminal 8 (for example, a smartphone) of a user, and dispatches the selected vehicle to the user's current location (or a location appointed by the user). Although not shown, a vehicle dispatch request may be sent from a user's computer terminal (fixed terminal). In this case, a vehicle selected by vehicle dispatch center 9 is dispatched to a location appointed by the user.

Vehicle 1 is configured to perform automated driving with no driver on board (hereinafter referred to as "self-driving"). Self-driving refers to control in which driving operations, such as acceleration, deceleration, stopping, and steering, of a vehicle are performed without a vehicle driver's operation. Self-driving includes, for example, lane keeping control and navigation control. In the lane keeping control, a handle (not shown) is automatically steered so that the vehicle can travel along a driving lane without deviating from the driving lane. In the navigation control, if there is no vehicle in front of the vehicle, constant-speed control is executed in which the vehicle is controlled to travel at a preset constant speed; whereas, if there is a vehicle in front of the vehicle, follow-up control is executed in which the vehicle speed is adjusted in accordance with the distance from the vehicle in front.

Vehicle 1 is, for example, an electric vehicle (EV). Vehicle 1, however, may travel by any power source. Vehicle 1 may be a vehicle that requires fuel for traveling, such as a gasoline vehicle or a diesel vehicle (a so-called conventional vehicle); or may be a hybrid vehicle (including a plug-in hybrid vehicle); or may be a fuel cell vehicle. Although only three vehicles 1 are shown in FIG. 1 to avoid complexity of the figure, the number of vehicles 1 is not particularly limited. In many cases, a larger number of vehicles are included in vehicle dispatch system 900.

In order to implement communication among vehicles 1, portable terminals 8, and vehicle dispatch center 9, base station devices 5 and wireless local area network (LAN) spots 6 are provided on a communication network 7.

Each base station device 5 is a base station device in conformity with, for example, long term evolution (LTE). Each base station device 5, however, may use any other communication system, such as wideband code division multiple access (W-CDMA). Alternatively, each base station device 5 may be configured to switch between a plurality of communication systems. Each of a plurality of vehicles 1 and vehicle dispatch center 9 are configured to perform two-way wireless communication via base station devices 5 and communication network 7, and are configured to exchange various types of information with each other.

Each wireless LAN spot 6 includes a router (a device having an access point and a router integrated together) for establishing a LAN spot. Portable terminal 8 is connected to wireless LAN spot 6 and thus can perform high-speed data communication via the internet. Communication service with wireless LAN spots 6 is provided by, for example, common carriers, public facilities, restaurants or a stores for pay or for free.

In the present embodiment, each of a plurality of vehicles 1 is equipped with a wireless LAN module 42. Wireless LAN module 42 is configured to perform two-way communication with portable terminal 8, and is configured to perform two-way communication with wireless LAN spot 6. Thus, wireless LAN module 42 is capable of relaying communication between portable terminal 8 and wireless LAN spot 6. The details of Wireless LAN module 42 are described later.

Vehicle dispatch center 9, which manages the traveling status of each vehicle 1, provides necessary information to vehicle 1 and sends various instructions to vehicle 1. Vehicle dispatch center 9 includes a server 90, a map information data base 91, a vehicle information data base 92, an event information data base 93, a wireless information data base 94, and a communication module 95.

Map information data base 91 contains road map data. Vehicle information data base 92 contains information indicating the status of use of each vehicle 1 and positional information of each vehicle 1 (also collectively referred to as "vehicle information") (see FIG. 6). Event information data base 93 contains information on the venue and the date and time of each of various events (entertainments), such as concerts and sports events (see FIG. 9). Wireless information data base 94 contains wireless information indicating the condition of a wireless communication network (see FIG. 10).

Server 90 is a processor for executing various types of processes for dispatching an appropriate one of a plurality of vehicles 1 to a user's location in response to a request from the user. The details of the information (data) contained in each data base and the processes performed by server 90 are described later.

<Vehicle Configuration>

Figure 2:
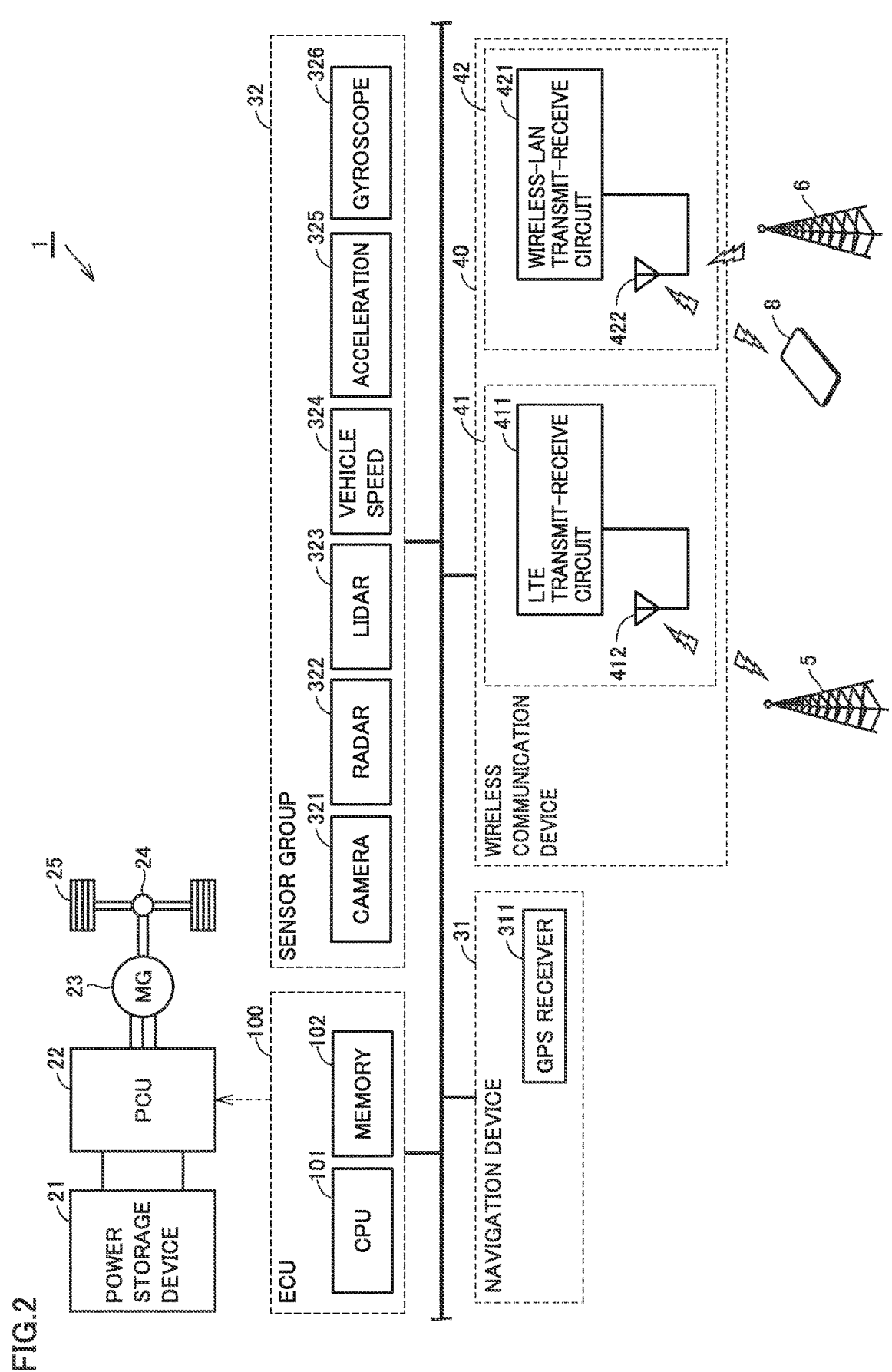
FIG. 2 is a diagram schematically showing a configuration of a vehicle.

FIG. 2 is a diagram schematically showing a configuration of vehicle 1. With reference to FIG. 2, vehicle 1 includes a power storage device 21, a power control unit (PCU) 22, a motor generator (MG) 23, a drive-train gear 24, a driving wheel 25, and an electronic control unit (ECU) 100.

Power storage device 21 is a rechargeable DC power supply and includes a secondary battery, such as a lithium-ion secondary battery or a nickel-hydrogen battery. A capacitor, such as an electric double layer capacitor, may also be used as power storage device 21. Power storage device 21 supplies PCU 22 with power for generating a force for driving vehicle 1. Power storage device 21 is charged with power generated by regenerative braking of motor generator 23, and is charged with power supplied from the outside of the vehicle.

PCU 22 performs power conversion between power storage device 21 and motor generator 23 in accordance with an instruction from ECU 100. PCU 22 includes an inverter configured to receive power from power storage device 21 to drive motor generator 23, and a converter configured to adjust the level of DC voltage supplied to the inverter (both not shown).

Motor generator 23 is an AC motor, such as a permanent-magnet-type synchronous motor having a rotor with an embedded permanent magnet. Motor generator 23 is driven by the inverter included in PCU 22 and rotates a drive shaft (not shown). The torque output from motor generator 23 is transmitted to driving wheel 25 through drive-train gear 24, thereby allowing vehicle 1 to travel. At the time of braking of the vehicle, motor generator 23 receives the rotatory power of the driving wheel and generates power. The power generated by motor generator 23 is stored in power storage device 21 through PCU 22.

Although not shown, vehicle 1 further includes a power converter and an inlet as a configuration for charging power storage device 21 with power from the outside of the vehicle (so-called external charging).

Vehicle 1 further includes a navigation device 31 and a sensor group 32, as a configuration for obtaining a situation outside vehicle 1 or a traveling state of vehicle 1.

Navigation device 31 includes a global positioning system (GPS) receiver 311 configured to identify a current location of vehicle 1 based on radio waves from artificial satellites. Navigation device 31 executes various types of navigation processes of vehicle 1 by using positional information (GPS information) of a current location of vehicle 1 identified by GPS receiver 311. Specifically, navigation device 31 calculates a traveling route (expected traveling route or target route) from a current location of vehicle 1 to a destination based on GPS information of vehicle 1 and road map data stored in a memory (not shown), and outputs information on the traveling route to ECU 100.

Sensor group 32 detects a situation outside vehicle 1, and detects information associated with a traveling state of vehicle 1 and an operation of vehicle 1 (a steering operation, an accelerating operation, and a braking operation). ECU 100 is configured to perform self-driving (full-automated driving or automatic traveling-around) based on various types of information detected (or obtained) by sensor group 32. That is, in the automated driving with sensor group 32, a driver is required to neither ride in nor operate the vehicle under any situation. Specifically, sensor group 32 includes a camera 321, radar 322, laser imaging detection and ranging (LIDAR) 323, a vehicle speed sensor 324, an acceleration sensor 325, and a gyroscope sensor 326.

Camera 321 captures an image of a situation outside vehicle 1 and outputs, to ECU 100, the captured-image information regarding the situation outside vehicle 1.

Radar 322 sends radio waves (for example, millimeter waves) to surroundings of vehicle 1 and receives radio waves reflected by an obstacle to detect the obstacle. The radar outputs, to ECU 100, a distance to the obstacle and a direction of the obstacle as obstacle information regarding the obstacle, for example.

LIDAR 323 transmits light (typically, ultraviolet rays, visible rays, or near infrared rays) to surroundings of vehicle 1 and receives light reflected by an obstacle to measure a distance to the reflecting point and detect the obstacle. LIDAR 323 outputs, to ECU 100, the distance to the obstacle and a direction of the obstacle as obstacle information, for example.

Vehicle speed sensor 324 is provided at a wheel of vehicle 1 or a drive shaft. Vehicle speed sensor 324 detects a rotating speed of the wheel, and outputs vehicle speed information including a speed of vehicle 1 to ECU 100.

Acceleration sensor 325 includes: a forward/backward acceleration sensor configured to detect acceleration in a forward/backward direction of vehicle 1; and a lateral acceleration sensor configured to detect lateral acceleration of vehicle 1, for example. Acceleration sensor 325 outputs acceleration information including both the accelerations to ECU 100.

Gyroscope sensor 326 detects a gradient of vehicle 1 relative to the horizontal direction, and outputs gradient information of a traveling path of vehicle 1 to ECU 100.

Vehicle 1 further includes a wireless communication device 40 for performing wireless communication with the outside of the vehicle. Wireless communication device 40 includes a base-station communication module 41 and wireless LAN module 42.

Base-station communication module 41 is a device for performing communication with base station devices 5 in conformity with, for example, LTE. Base-station communication module 41 includes an LTE transmit-receive circuit 411 and an antenna 412.

Wireless LAN module 42 is a device for performing wireless LAN communication with portable terminal 8 (or wireless LAN spot 6). Wireless LAN module 42 includes a wireless-LAN transmit-receive circuit 421 and an antenna 422. A plurality of wireless LAN modules may be mounted on vehicle 1 each of which corresponds to the type (communication standard) of the wireless LAN. Wireless LAN module 42 corresponds to a "wireless communication device" according to the present disclosure.

ECU 100 includes a central processing unit (CPU) 101, a memory 102, and an input/output port (not shown) for inputting and outputting various types of signals. ECU 100 executes various types of control (e.g. lane keeping control and navigation control) for implementing self-driving of vehicle 1, based on the inputs from sensor group 32. ECU 100 also sends various pieces of information (e.g. positional information of vehicle 1) to server 90 and receives instructions or notifications from server 90, via base-station communication module 41.

<Reinforcement of Wireless Communication Network>

Figure 3:
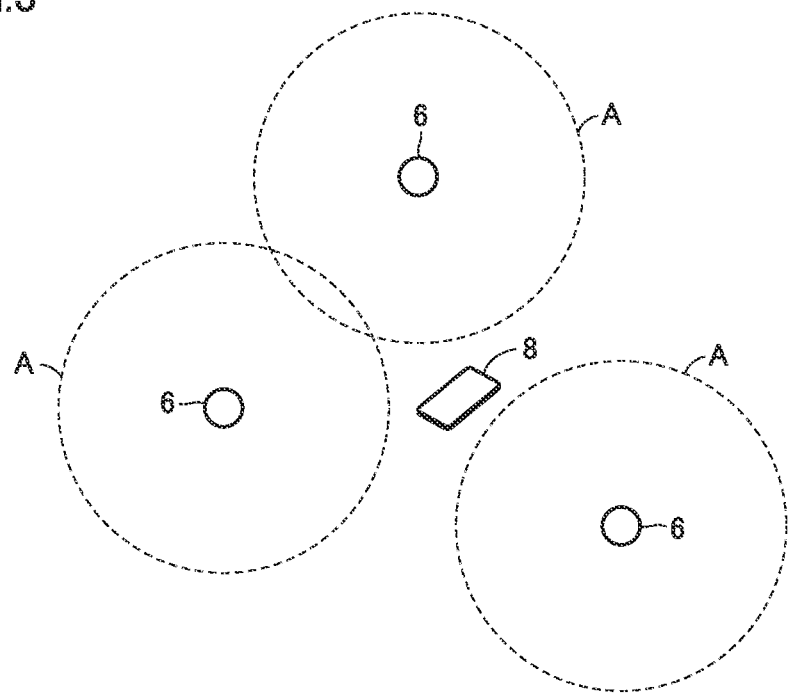
FIG. 3 is a conceptual diagram for explaining an example radio wave condition of a wireless communication network.

FIG. 3 is a conceptual diagram for explaining an example radio wave condition (wireless condition) of a wireless communication network. In public wireless LAN service, two-way communication is performed between portable terminal 8 and wireless LAN spot 6. An area within the reach of radio waves from wireless LAN spot 6 and therefore within two-way communication range is commonly referred to as a "cell" or a "coverage area".

FIG. 3 illustrates a relationship among cells A of three wireless LAN spots 6 by way of example. In this example, there is an area where radio waves cannot reach (an area outside the radio wave range) between cells A of three wireless LAN spots 6. Portable terminal 8 shown in FIG. 3 is located in such an area outside the radio wave range. Therefore, public wireless LAN service cannot be provided to portable terminal 8.

The present embodiment adopts a configuration in which, in the above case, a request for reinforcement of a wireless communication network can be sent from user's portable terminal 8. Server 90 dispatches vehicle 1 equipped with wireless LAN module 42, in response to a user request (a vehicle dispatch request from portable terminal 8). This request from portable terminal 8 is hereinafter also referred to as a "request for reinforcement". The request for reinforcement corresponds to a "vehicle dispatch request" according to the present disclosure.

Figure 4:
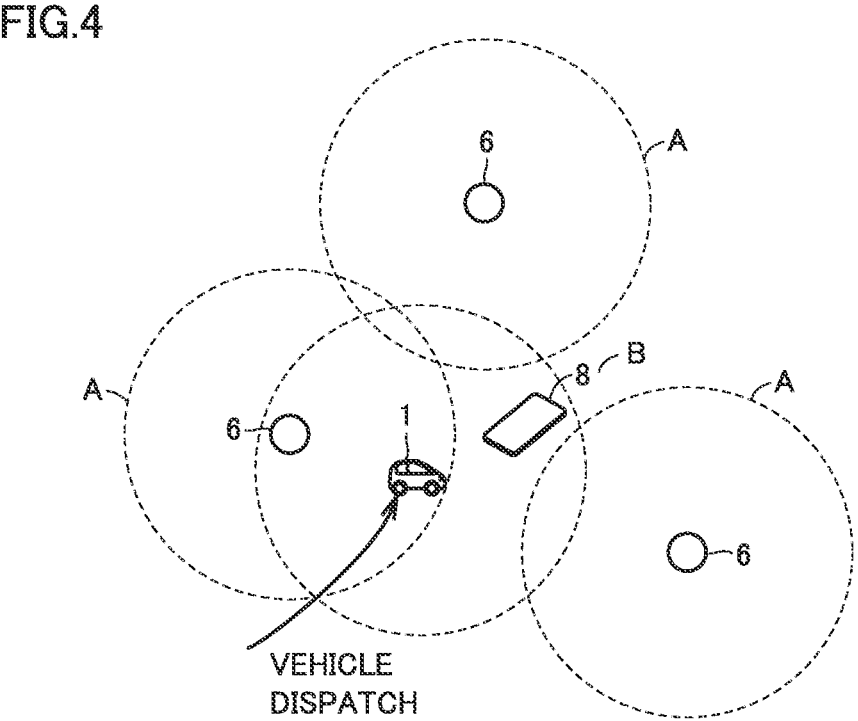
FIG. 4 is a conceptual diagram for explaining how a wireless communication network is reinforced.

FIG. 4 is a conceptual diagram for explaining how a wireless communication network is reinforced. As shown in FIG. 4, in response to a request for reinforcement from portable terminal 8, server 90 dispatches vehicle 1 to a location such that portable terminal 8 is included in cell B of wireless LAN module 42 mounted on vehicle 1. When vehicle 1 arrives at the location specified by server 90, vehicle 1 stands by at the location until receiving a subsequent instruction. A wireless communication network of public wireless LAN service is reinforced by wireless LAN module 42 mounted on vehicle 1, and thus communication between portable terminal 8 and adjacent wireless LAN spot 6 can be relayed, for example. That is, the public wireless LAN service can be provided to portable terminal 8.

It is desirable that vehicle 1 to be dispatched be selected from among vehicles with no user on board (empty vehicles that are not carrying a user). Specific examples of such vehicles include a vehicle which is automatically traveling around a town (a vehicle which is not reserved for pickup), and a vehicle being on standby at a parking lot or the like until receiving a subsequent instruction from server 90. In this way, a vehicle that is not being used to carry a user can be utilized for providing public wireless LAN service, and thus user convenience of wireless communication can be enhanced while additional cost required to purchase and manage vehicles is reduced.

<Flow of Reinforcing Wireless Communication Network>

Figures 5, 6:
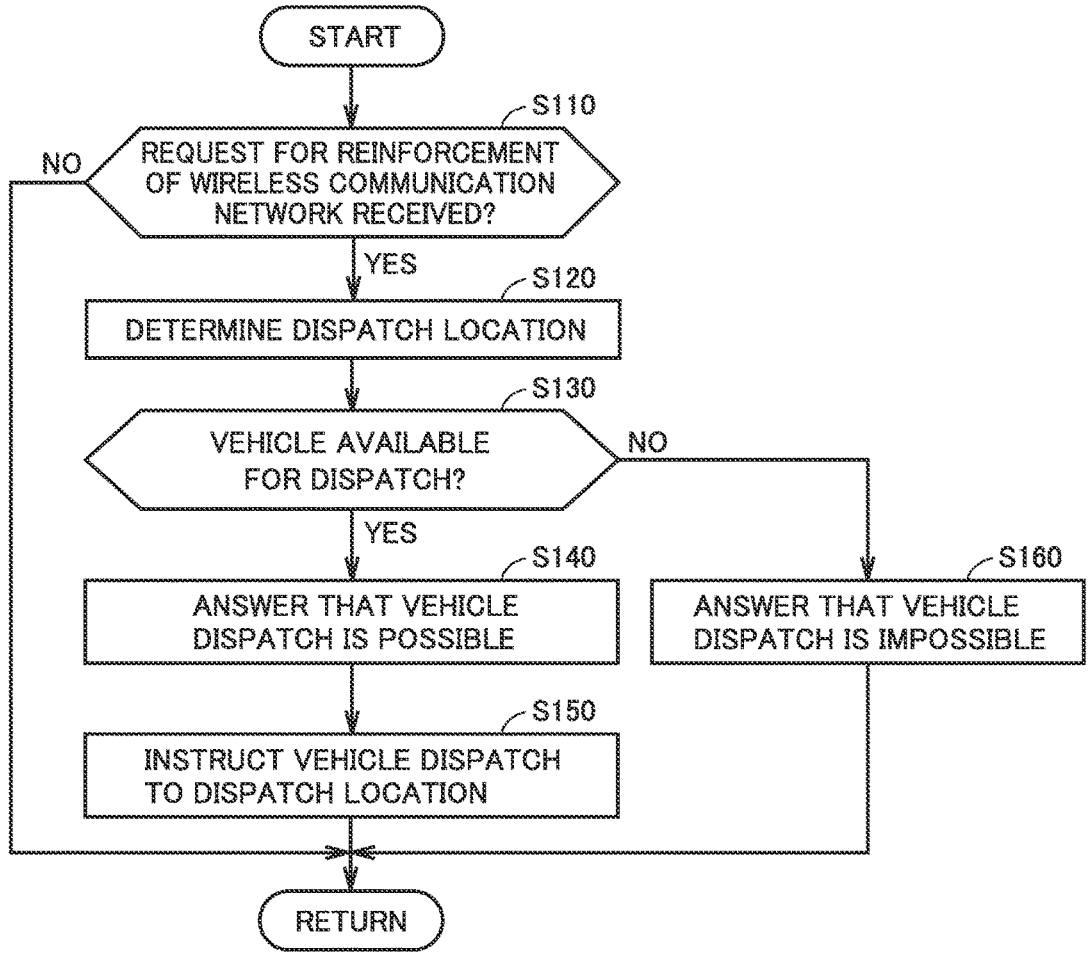
FIG. 5 is a flowchart for explaining a process for reinforcement of a wireless communication network in embodiment 1.
FIG. 6 is a diagram showing example vehicle information.
Figure 8:
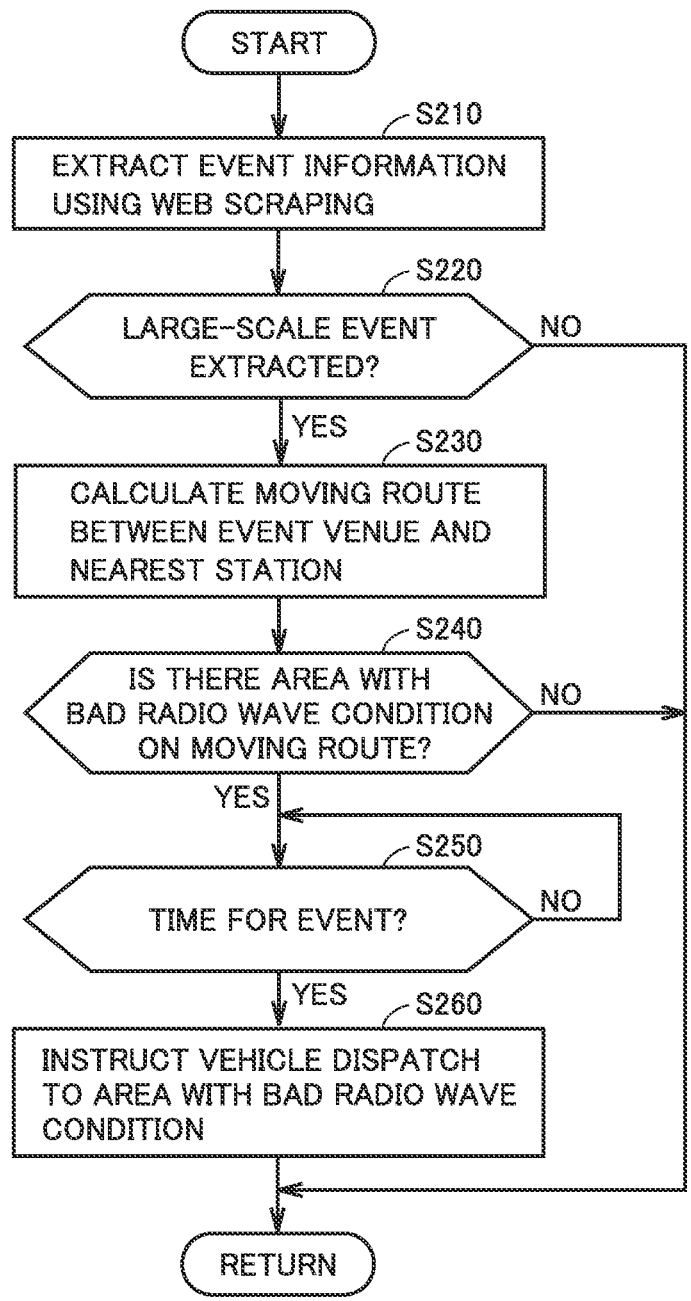
FIG. 8 is a flowchart for explaining control for reinforcement of a communication network in embodiment 2.

FIG. 5 is a flowchart for explaining a process for reinforcement of a wireless communication network in embodiment 1. The flowchart shown in FIG. 5 and the later-described flowcharts shown in FIG. 8 and FIG. 11 are each called from a main routine by server 90 for execution each time a predetermined arithmetic period has elapsed, for example. The steps (hereinafter referred to as "S" for short) included in the flowcharts are basically implemented by software processing by server 90. However, the steps may be implemented by hardware processing by an electric circuit fabricated in server 90.

With reference to FIG. 5, at S110, server 90 determines whether or not a request for reinforcement of a wireless communication network has been received from portable terminal 8. Portable terminal 8 can send a request for reinforcement upon receiving a user operation. Portable terminal 8 may send information on user's desired wireless LAN communication standard (or a communication standard compatible with portable terminal 8), along with a request for reinforcement.

Portable terminal 8 may send a request for reinforcement when the portable terminal 8 which has been within any of cells A detects itself coming out of the cell A due to movement of a user (that is, autonomously without a user operation).

If, for example, service for reinforcement of a wireless communication network is provided for pay, server 90 may determine "there is a request for reinforcement of a wireless communication network" upon receiving a request for reinforcement from one portable terminal 8.

If, for example, service for reinforcement of a wireless communication network is provided for free, the number of requests for reinforcement is likely to be larger than in the case where the service for reinforcement is provided for pay. In this case therefore, server 90 may determine "there is a request for reinforcement of a wireless communication network" upon receiving requests for reinforcement from a certain number of (a plurality of) portable terminals 8 within a predetermined period of time and within a predetermined area (that is, when requests for reinforcement concentrate to some degree). If it is determined that there is no request for reinforcement of a wireless communication network (NO at S110), the process is returned to the main routine.

If it is determined that there is a request for reinforcement of a wireless communication network (YES at S110), server 90 determines a dispatch location of vehicle 1 (a location to which vehicle 1 is to be dispatched) (S120). Specifically, server 90 may obtain positional information (GPS information) of portable terminal 8 that has sent the request for reinforcement, and may determine the position to be a dispatch location. If there are a plurality of portable terminals 8 that have sent the request for reinforcement, server 90 may calculate the midpoint of these portable terminals 8 from the positional information of them, and may determine the midpoint to be a dispatch location of vehicle 1.

At S130, server 90 determines whether or not there is vehicle 1 available for dispatch to the dispatch location determined at S120. For this determination, vehicle information contained in vehicle information data base 92 (see FIG. 1) is used.

FIG. 6 is a diagram showing example vehicle information. As shown in FIG. 6, vehicle information includes: information on a vehicle type; a status of use; a current location; whether or not the vehicle is equipped with wireless LAN module 42; a state of charge (SOC) of power storage device 21, for each of various vehicles, for example. The information on the status of use of a vehicle includes: information indicating that the vehicle is traveling toward a destination with a user on board (riding); information indicating that the vehicle is traveling toward a user's location (traveling for pickup); information indicating that the vehicle is out of service (including being on standby); or information indicating that the vehicle is being externally charged, for example. Information on whether or not the vehicle is equipped with wireless LAN module 42 may be defined for each communication standard of wireless LAN.

In the example shown in FIG. 6, among the three vehicles equipped with wireless LAN module 42 (the vehicles with the vehicle IDs of 1001, 1002, and 1003), a vehicle that is currently out of service (the vehicle with the vehicle ID of 1002) is desirably dispatched. If there are a plurality of vehicles 1 available for dispatch, a vehicle that will take the shortest time to arrive at a dispatch location may be selected, for example.

Referring back to FIG. 5, if there is vehicle 1 available for dispatch (YES at S130), server 90 answers to portable terminal 8 that has sent the request for reinforcement that vehicle 1 is available for dispatch (S140). In addition to such an answer, server 90 may notify an expected arrival time of vehicle 1 to the dispatch location determined at S120. Server 90 then dispatches vehicle 1 to the dispatch location determined at S120 (S150).

If there is no vehicle 1 available for dispatch (NO at S130), server 90 answers to portable terminal 8 that there is no vehicle 1 available for dispatch to the dispatch location at present and that vehicle dispatch is impossible (S160).

As described above, according to embodiment 1, when server 90 receives a request for reinforcement of a wireless communication network from user's portable terminal 8, server 90 dispatches vehicle 1 to a location where radio waves of wireless LAN spot 6 cannot reach (or a location where radio waves are weak). Wireless LAN module 42 mounted on vehicle 1 reinforces the wireless communication network and enables portable terminal 8 to access the internet at a high speed, thereby enhancing user convenience of wireless communication. Further, utilizing a vehicle that is not being used to carry a user as a dispatch vehicle eliminates the need for preparing a special-purpose vehicle, thus reducing additional cost.

Embodiment 2

Embodiment 1 has described a configuration in which server 90 dispatches vehicle 1 in response to a request for reinforcement of a wireless communication network from user's portable terminal 8. However, when a request for reinforcement is expected to generate, server 90 may dispatch vehicle 1 in advance rather than waiting for a request for reinforcement to be received. Embodiment 2 describes a configuration for predicting, from information on the internet, occurrence of a condition that is likely to cause an insufficient wireless communication network.

Specifically, server 90 in embodiment 2 extracts information on an event from information on the internet. Although any type of event may be extracted, specific examples of events include: musical events (live performances, concerts); theatrical shows; watching games of sports (professional baseball, professional soccer); trade fairs; and exhibitions. A vehicle dispatch system according to embodiment 2 is the same in configuration as vehicle dispatch system 900 according to embodiment 1 (see FIG. 1 and FIG. 2), and the explanation thereof is not repeated.

Figure 7:
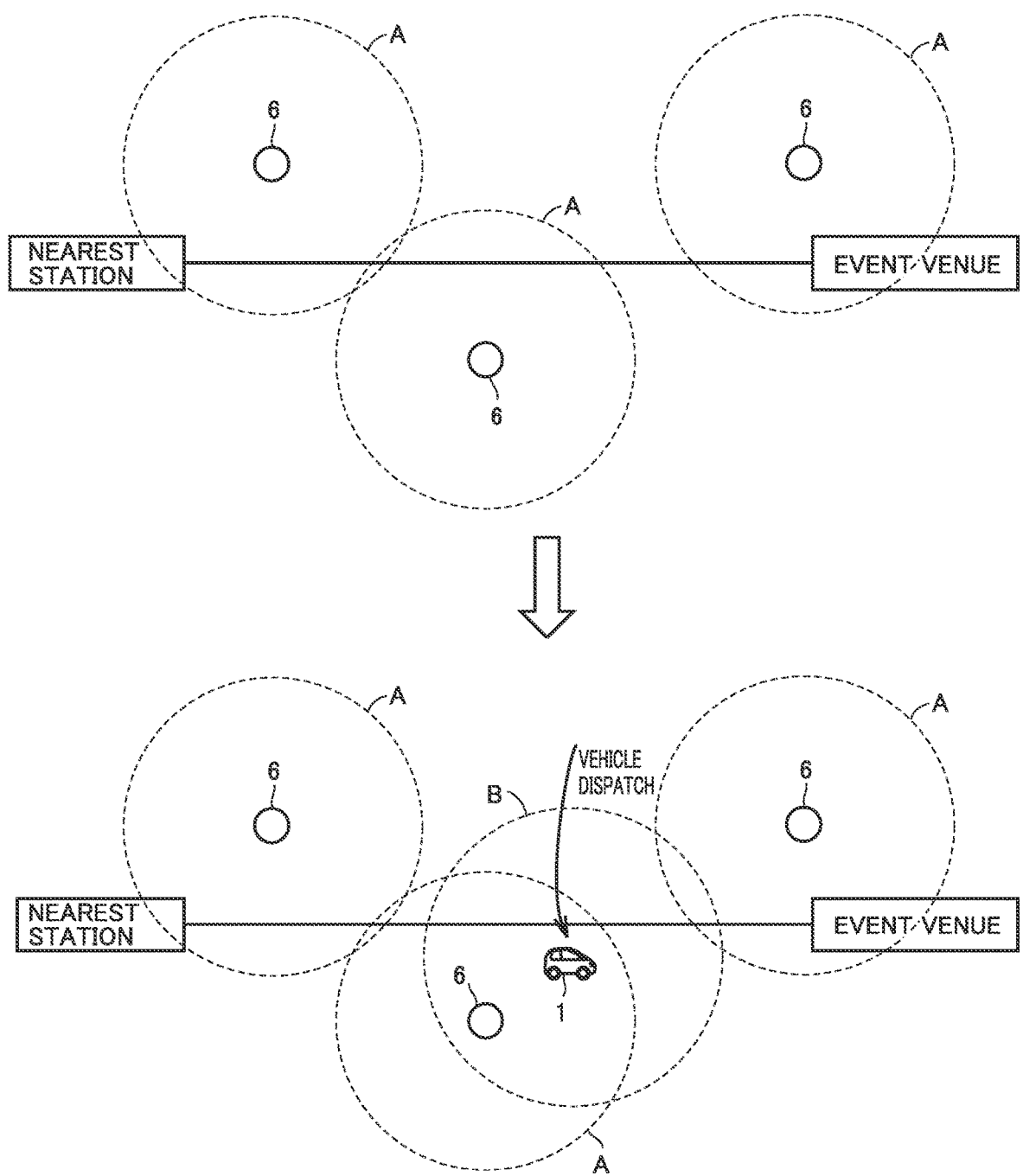
FIG. 7 is a diagram for explaining reinforcement of a wireless communication network using a vehicle at the time of an event.

FIG. 7 is a diagram for explaining reinforcement of a wireless communication network using vehicle 1 at the time of an event. It is likely that many attendees gather at an event and that an increased number of people use wireless LAN spots 6. Each wireless LAN spot 6 has a capacity for communication. Therefore, if cell A contains a number of portable terminals 8 such that the required communication traffic exceeds the capacity, portable terminals 8 may become incapable of communication (incapable of accessing the internet) or may be subject to reduction in communication speed, even if there are a certain number of wireless LAN spots 6.

In view of such circumstances, as shown in FIG. 7, if there is an area where the radio wave condition is bad (an area where the radio wave intensity is low) on a moving route connecting an event venue and the nearest station, vehicle 1 is dispatched to the area having the low radio wave intensity, before the number of attendees heading for or leaving from the event venue is at peak, in accordance with a vehicle dispatch instruction from server 90. Thus, cell B of wireless LAN module 42 mounted on vehicle 1 reinforces a wireless communication network. This enables portable terminals 8 of event attendees to access the internet at a high speed, thus enhancing convenience of wireless communication.

FIG. 8 is a flowchart for explaining a process for reinforcement of a wireless communication network in embodiment 2. With reference to FIG. 8, at S210, event information is extracted from the internet by using web scraping. Specifically, server 90 regularly collects a web site on the internet (e.g. a website of an event organizer) and analyzes the language on the website (e.g. hypertext markup language: HTML) to extract information related to an event. Web scraping may also be referred to as web crawler or web spider. Event information extracted by web scraping is stored in event information data base 93.

FIG. 9 is a diagram showing example event information. As shown in FIG. 9, event information includes: identification information (ID) for distinguishing between events; an event name; an event venue; the nearest station of the venue; a time (start time and finish time) of an event; and information on the expected number of event attendees.

The nearest station of a venue is merely an example of an adjacent public transportation facility to be used by event attendees, and is not limited to a train station. Event information may include information on an adjacent parking lot, bus stop, airport and the like additionally or alternatively to information on the nearest station. There may be a plurality of pieces of information on the nearest station, and/or information on the nearest station may be combined with information on other public transportation facilities.

If a direct numerical value (the number of attendees expected by an event organizer) cannot be extracted from information on the internet as the expected number of event attendees, the number may be determined based on the capacity of an event venue (e.g. a live performance hall, a concert hall, or a stadium), for example. Alternatively, the number may be determined by the actual number of attendees of the same event in the past.

Note that it is not essential to produce event information by web scraping alone. Event information may be produced by combining, as appropriate, information extracted by web scraping and information obtained by a manager of vehicle dispatch center 9.

Referring back to FIG. 8, at S220, server 90 determines whether or not information on a large-scale event has been extracted as event information. Server 90 determines that a large-scale event has been extracted when the expected number of attendees defined by the event information is larger than a predetermined number.

If a large-scale event has been extracted (YES at S220), server 90 calculates a moving route of event attendees based on information on the venue and the nearest station included in the event information (S230). The calculation of a moving route may be performed by a common path search technology for a navigation device or the like. Alternatively, a typical moving route of event attendees may be preliminarily examined for each event venue, and the result of the examination may be stored in event information data base 93 along with the above-described event information.

At S240, server 90 determines whether or not there is an area where the radio wave intensity is low on the moving route connecting the event venue and the nearest station. The information on whether or not there is an area where the radio wave intensity is low may be obtained by, for example, making vehicle 1 travel on the moving route in advance to examine the radio wave condition (i.e., making vehicle 1 examine whether sufficiently high-speed communication is possible). The result of such examination is stored in wireless information data base 94 as wireless information.

FIG. 10 is a diagram showing example wireless information. As shown in FIG. 10, wireless information defines: road identification information; place name (which may be a name of road or a name of block); positional information (longitude information and latitude information); examination date and time (e.g. a date, a day of week, a time of examination); and information on a radio wave intensity, for example. The radio wave intensity is indicated by an index on a scale of one to five, a status with no radio waves detected being indicated by "0", and a status with the strongest radio waves being indicated by "4". Alternatively, the radio wave intensity may be indicated by the communication speed (maximum communication speed) of the relevant area.

Referring back to FIG. 8, if there is no area where the radio wave condition is bad on the moving route, e.g., if an index indicating the radio wave intensity is more than or equal to a predetermined value for all the areas on the moving route (NO at S240), server 90 returns the process to the main routine. On the other hand, if there is an area where the radio wave condition is bad on the moving route, i.e., if there is an area for which an index indicating the radio wave intensity is less than the predetermined value (YES at S240), server 90 waits until the time for the event (S250). For example, if the present time is a predetermined period of time ahead of the start time of the event or if the present time is a predetermined period of time ahead of the finish time of the event, the result of determination at S250 is YES. The predetermined time is defined in consideration of the travel time of event attendees and the time required for dispatching vehicle 1.

When it is the time for the event (YES at S250), server 90 dispatches vehicle 1 to the area where the radio wave condition is bad identified at S240 as described with reference to FIG. 7 (S260). The number of vehicles to be dispatched is not limited to one, but many vehicles 1 may be dispatched so as to cover as large an area with a bad radio wave condition as possible, up to a ceiling of the number of vehicles 1 available for dispatch.

As described above, according to embodiment 2, a vehicle that is not being used to carry a user can be utilized, and thus user convenience of wireless communication can be enhanced, as in embodiment 1. In embodiment 2 in particular, vehicle 1 is dispatched so as to coincide with a large-scale event without a request from a user. Thus, public wireless LAN service can be timely provided to a region to which a vehicle is dispatched. This can eliminate a region where high-speed data communication is impossible, and can reduce congestion of communication.

Embodiment 2 has described a case of an event where a large number of attendees gather. However, vehicle 1 may be dispatched based on a combination of information on the number of traveling people and a travel time. For example, vehicle 1 may be dispatched to a route to (or from) a business district when people are going to (or coming from) the business district. Also, at recreational facilities and tourist sites, vehicle 1 may be dispatched so as to coincide with a holiday such as a long holiday period (and a time when congestion is expected).

Variation of Embodiment 2

Embodiment 2 has described a case in which vehicle 1 is dispatched based on event information collected in advance. A variation of embodiment 2 describes a configuration in which vehicle 1 is dispatched based on information collected on a real-time basis.

FIG. 11 is a flowchart for explaining a process for reinforcement of a wireless communication network in a variation of embodiment 2. With reference to FIG. 11, at S310, server 90 obtains the condition of distribution of users. Specifically, for example, server 90 may obtain what region has what distribution of population, based on information taken by surveillance cameras installed on streets.

Server 90 may obtain the condition of distribution of portable terminals 8, instead of the condition of distribution of users. For example, server 90 may be provided with information indicating a situation of communication (a situation of congestion in communication) between portable terminals 8 and base station devices 5, from a company of portable terminal 8 (cell-phone company), and thus may obtain information on areas with high and low densities of portable terminals 8.

At S320, server 90 determines whether or not there is an area where the population density is high (or where the density of portable terminals 8 is high) based on the information obtained at S310. If there is no area where the population density exceeds a predetermined density (NO at S320), the process is returned to the main routine.

On the other hand, if there is an area where the population density exceeds the predetermined density (YES at S320), server 90 determines whether or not the radio wave condition is bad in the area. Whether the radio wave condition is good or bad can be determined based on the wireless information contained in wireless information data base 94 as described in embodiment 2.

If the area where the population density exceeds the predetermined density has an index indicating the radio wave condition less than a predetermined value (YES at S330), server 90 determines that the radio wave condition is bad in the area, and dispatches vehicle 1 to the area (S340). If the area where the population density exceeds the predetermined density has an index indicating the radio wave condition more than or equal to the predetermined value (NO at S330), server 90 determines that the area does not need an improvement in radio wave condition, and skips over the process of S340 to return the process to the main routine.

As described above, according to the variation of embodiment 2, a vehicle that is not being used to carry a user can be utilized, and thus user convenience of wireless communication can be enhanced, as in embodiments 1 and 2. Further, in the variation of embodiment 2, at the processes of S310 and S320, it is determined on a real-time basis whether or not there is an area where the population density exceeds a predetermined density (or an area where the density of portable terminals 8 exceeds a predetermined density), and the vehicle 1 is dispatched to such an area if any. Thus, unexpected concentration of population (sudden increase in the number of portable terminals 8) with no scheduled event or the like can be coped with. This can eliminate a region where high-speed data communication is impossible, and can reduce congestion of communication, even if such unexpected concentration of population occurs.

Although embodiments of the present invention have been described, it should be understood that the embodiments disclosed herein are by way of illustration and example only in every respect, and are not to be taken by way of limitation. The scope of the present invention is defined by the terms of the appended claims and is intended to include any modification within the scope and meaning equivalent to the terms of the claims.

What is claimed is:

1. A vehicle dispatch system comprising:
    a plurality of vehicles each configured to perform automated driving and each including a wireless communication device; and
    a server configured to communicate with the plurality of vehicles,
    wherein
        the wireless communication device is configured to connect to a user terminal and an access point of a wireless local area network (LAN) communication network, and is configured to relay wireless communication between the user terminal and the wireless LAN communication network,
        the server is configured to select an empty vehicle with no user on board among the plurality of vehicles and output, to the empty vehicle, an instruction for dispatching the empty vehicle by automated driving, in accordance with a vehicle dispatch request from the user terminal, and
        the empty vehicle, in response to the instruction, is configured to relay wireless communication between the user terminal and the wireless LAN communication network by using the wireless communication device.

2. The vehicle dispatch system according to claim 1, wherein
    the user terminal is configured to send the vehicle dispatch request in response to an operation by a user, and
    the server is configured to dispatch the empty vehicle a location requested by the user, in accordance with the vehicle dispatch request from the user terminal.

3. The vehicle dispatch system according to claim 1, wherein
    the user terminal is configured to send the vehicle dispatch request when the user terminal detects that the radio wave intensity of the wireless LAN communication network is low, and
    the server is configured to dispatch the empty vehicle a location such that wireless communication between the user terminal and the wireless LAN communication network can be relayed, in accordance with the vehicle dispatch request from the user terminal.

4. The vehicle dispatch system according to claim 1, wherein the server is configured to:
    extract information on a venue of an event from a website on an internet;
    obtain a location where the radio wave intensity is low between the venue and a transportation facility around the venue; and
    dispatch, at a time of the event, the empty vehicle to the location where the radio wave intensity is low.

5. The vehicle dispatch system according to claim 4, further comprising a database containing a result of examination of the radio wave intensity on a route between the venue and the transportation facility, wherein
    the server is configured to determine whether or not there is a location where the radio wave intensity is low on the route, by using the result of examination contained in the data base.

6. The vehicle dispatch system according to claim 1, further comprising a database containing a result of examination of the radio wave intensity of the wireless LAN communication network in a predetermined area, wherein
    the server is configured to:
        determine whether or not the radio wave intensity of the wireless LAN communication network is low in the predetermined area, by using the result of examination contained in the data base and by using information indicating the number of the user terminals in the predetermined area, and
        dispatch the empty vehicle to the predetermined area when the server determines that the radio wave intensity is low.

7. The vehicle dispatch system according to claim 1, wherein the server is configured to obtain a positional information of the user terminal and dispatch the empty vehicle such that the user terminal is within a range that the user terminal is capable of performing two-way communication with the wireless communication device.

8. The vehicle dispatch system according to claim 1, wherein the server is configured to dispatch the empty vehicle to a midpoint of the user terminal and other user terminal when the server receives a vehicle dispatch request from the other user terminal in addition to the vehicle dispatch request from the user terminal.

9. A vehicle dispatch method for dispatching a plurality of vehicles configured to perform automated driving,

- each of the plurality of vehicles including a wireless communication device configured to connect to a user terminal and an access point of a wireless LAN communication network and configured to relay wireless communication between the user terminal and the wireless LAN communication network, the vehicle dispatch method comprising:
- receiving a vehicle dispatch request from the user terminal;
- selecting an empty vehicle with no user on board among the plurality of vehicles;
- outputting, to the empty vehicle, an instruction for dispatching the vehicle by automated driving, in accordance with the vehicle dispatch request; and
- relaying, by the vehicle, in response to the instruction, wireless communication between the user terminal and the wireless LAN communication network by using the wireless communication device.

\* \* \* \* \*